United States Patent [19]

Randolph et al.

[11] 4,039,115
[45] Aug. 2, 1977

[54] APPARATUS FOR OBTAINING ABUTTING CONTACT OF HOLLOW TANK COURSES TO BE CIRCUMFERENTIALLY WELDED

[75] Inventors: Robert W. Randolph, St. Charles; Steven L. Jantzen, St. Louis, both of Mo.

[73] Assignee: ACF Industries, Incorporated, New York, N.Y.

[21] Appl. No.: 691,246

[22] Filed: June 1, 1976

[51] Int. Cl.² .................................. B23K 37/04
[52] U.S. Cl. ......................... 228/44.5; 228/49; 269/135; 269/287
[58] Field of Search ............... 228/44.1, 44.5, 48, 228/49; 269/287, 135

[56] References Cited

U.S. PATENT DOCUMENTS

| | | | |
|---|---|---|---|
| 3,020,041 | 2/1962 | Peterson et al. | 269/135 |
| 3,400,872 | 9/1968 | Rogers | 228/44.5 |
| 3,734,387 | 5/1973 | Sannipoli | 228/48 |

Primary Examiner—Al Lawrence Smith
Assistant Examiner—Robert C. Watson
Attorney, Agent, or Firm—Henry W. Cummings

[57] ABSTRACT

Circumferentially spaced jacks for clamping and supporting a pair of tank sections in end-to-end relationship during welding include spring biased gripping members mounted on at least some of the tank engaging ends of the jacks which initially grip the surfaces of the tank sections and then move in a direction to force the ends of the tank sections together as the jacks are extended.

16 Claims, 9 Drawing Figures

APPARATUS FOR OBTAINING ABUTTING CONTACT OF HOLLOW TANK COURSES TO BE CIRCUMFERENTIALLY WELDED

BACKGROUND OF THE INVENTION

In application Ser. No. 683,662 filed May 6, 1976, and assigned to the same assignee as this application, an assembly is disclosed for internal circumferential welding of abutting hollow tank sections or courses.

The apparatus includes three longitudinally spaced, axially aligned, rotatable rings. The center ring includes a plurality of circumferentially spaced, radially directed jacks each extendible the same distance regardless of the resistance encountered by a particular jack to force the abutting edges of the tank sections into a precise circular cross section and support and hold the abutting edges in aligned relation during rotation and welding. The other two rings include circumferentially spaced radially directed jacks of the seek-and-find type that will automatically extend until all jacks exert the same force on the tank sections extending from each side of the center ring to thereby support the tank sections for rotation about the common axis of the three rings, regardless of whether the tank sections are of cylindrical, right frusto-conical or scalene frusto-conical shape.

A longitudinal conveyor extends within the rings to move tank courses to be welded longitudinally into end-to-end abutting contact in the center ring. However, the longitudinal conveyor has not always been effective to bring the courses into abutting contact throughout the circumferential joint. This is particularly true if one course is out of round relative to the adjacent course, or if one course is slightly misaligned relative to the other course and gaps occur about the periphery of the abutting joint. While the center jacks tend to reduce the gaps and obtain a circular abutting joint for welding, slight longitudinal misalignment can cause considerable operator time to be spent attempting to achieve longitudinal alignment and abutting contact of the courses along the periphery of the joint to be welded, before a satisfactory abutting joint can be obtained for welding. Thus the production rate of the apparatus is reduced and the welding assembly line can be held up while the courses are aligned in the center ring and a satisfactory joint for welding is obtained.

SUMMARY OF THE INVENTION

This invention relates to welding apparatus having a plurality of radially directed jacks circumferentially spaced around a supporting ring for clamping and supporting a pair of tank sections in end-to-end relationship during welding of the tank sections together to form an elongated tank. In accordance with the present invention at least some of the tank section engaging ends of the jacks are provided with at least one spring biased tank engaging gripping member or jaw extending from the ends of the jacks. Means are provided interconnecting the gripping members with the ends of the jacks whereby the gripping member moves transversely of the direction of extension of the jacks when the gripping members are forced against the tank sections. As the jacks are extended to clamp and support the opposed ends of the tank sections, the gripping members initially engage and grip the surface at least of one of the tank sections and on further extension of the jacks the gripping members move transversely against the bias of the springs in a direction to move the end of the tank section longitudinally of the ring into end-to-end abutting engagement with an adjacent tank section for subsequent welding. Preferably a pair of gripping members are provided on the jacks longitudinally spaced on either side of the weld point whereby both tank sections to be welded are moved longitudinally of the ring toward each other and toward the desired welding point into abutting contacts as the jacks are extended and clamp the tank sections to be welded.

DETAILED DESCRIPTION OF THE INVENTION

Figure 1:
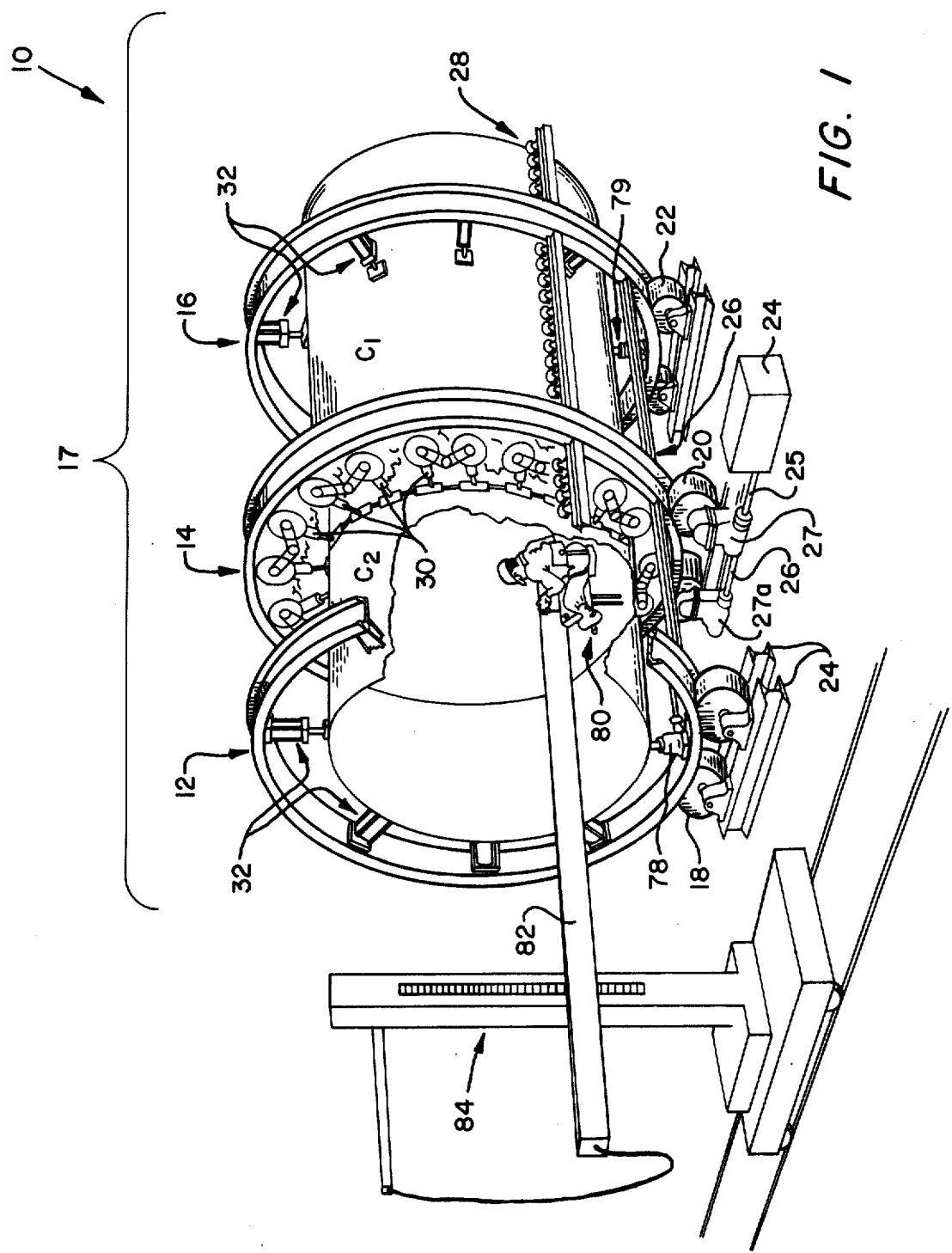
FIG. 1 is a schematic perspective view of a welding apparatus having clamping and supporting jacks incorporating the gripping members or jaws of the present invention.
Figure 2:
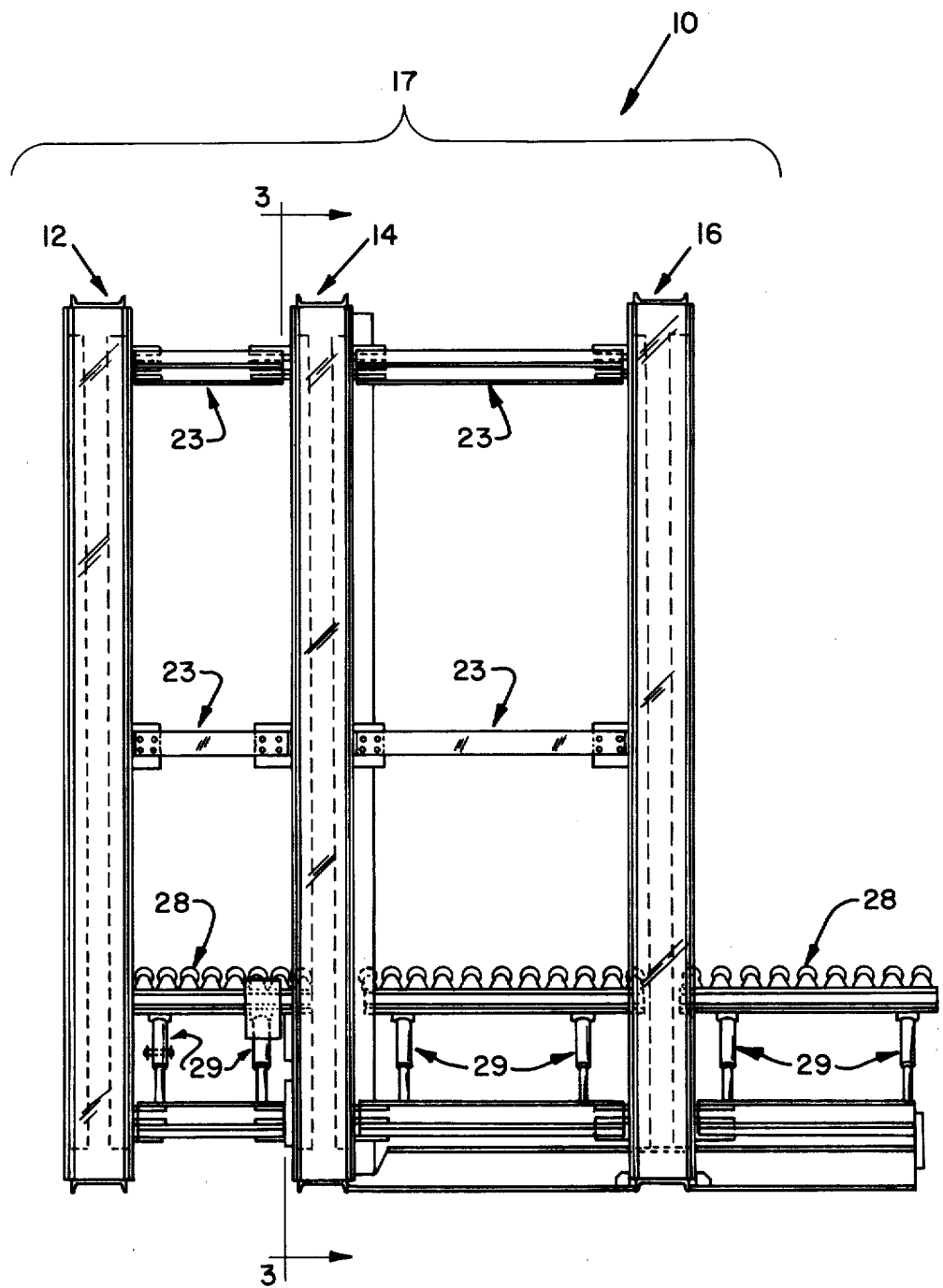
FIG. 2 is a front elevational view of the apparatus shown in FIG. 1.
Figure 3:
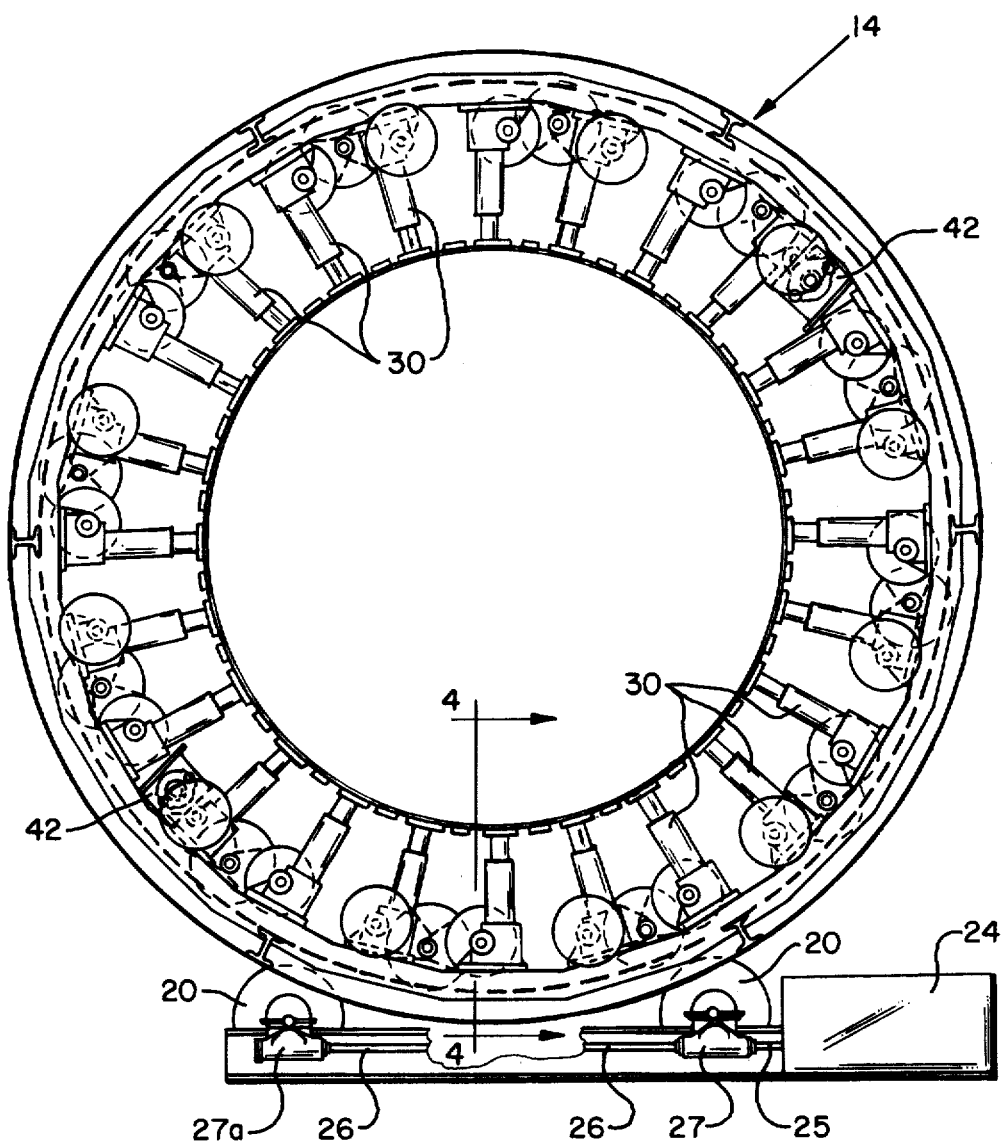
FIG. 3 is an end view taken in the direction of the arrows of the line 3—3 of FIG. 2.

Referring to FIG. 1, apparatus for clamping and supporting a pair of tank sections or courses $C_1$ and $C_2$ in end-to-end opposed relationship during welding is generally indicated by the reference numeral 10. The particular apparatus 10 as illustrated in FIGS. 1, 2 and 3, is generally of the type shown and described in copending application Ser. No. 683,662, filed May 6, 1976 and reference is made thereto for a more detailed description of the structure and operation thereof.

It is sufficient for an understanding of the present invention to point out that the apparatus 10 includes three longitudinally spaced, axially aligned rings 12, 14 and 16 which together define a welding cage 17. The rings 12, 14 and 16 are each supported for rotation on respective pairs of rollers 18, 20 and 22. The three rings 12, 14 and 16 are interconnected by a suitable frame structure 23 (FIG. 2) whereby the three rings 12, 14 and 16 rotate as a cage unit on the rollers 18, 20 and 22. As best shown in FIG. 3 rollers 20 of the center ring 14 are adapted to be driven by an electric motor 24 through shafts 25 and 26 and gear units 27 and 27a, and operation of the motor 24 therefore serves to simultaneously rotate the three rings 12, 14 and 16 as a unit. A roller conveyor 28, (FIGS. 1 and 2) serves to support and facilitate the loading of the tank sections or courses $C_1$ and $C_2$ within the cage 17 formed by the three rings 12, 14 and 16 until the opposed ends of the tank sections $C_1$ and $C_2$ are generally aligned with the center line of the center ring 14. The roller conveyor 28 is adjustable supported by adjustable supports 29 (FIG. 2).

A plurality of circumferentially spaced mechanical jacks 30 are secured to the inner perimeter of the ring 14 and extend radially inwardly. As will be described in more detail hereafter, simultaneous radial extension of the jacks 30 serve to clamp and support the opposed ends of the tank section or courses $C_1$ and $C_2$ during welding of the sections in end-to-end relationship to form an elongated tank.

As best shown in FIG. 1, each of the outer rings 12 and 16 has a plurality of circumferentially spaced, radially directed, hydraulic jacks 32 of the seek and find type. When extended, the jacks 32 serve to support the opposite ends of the tank sections $C_1$ and $C_2$ for rotation with the rings 12, 14 and 16 around the center line of the rings 12, 14 and 16 during welding of the opposed ends of the tank sections.

Figure 4:
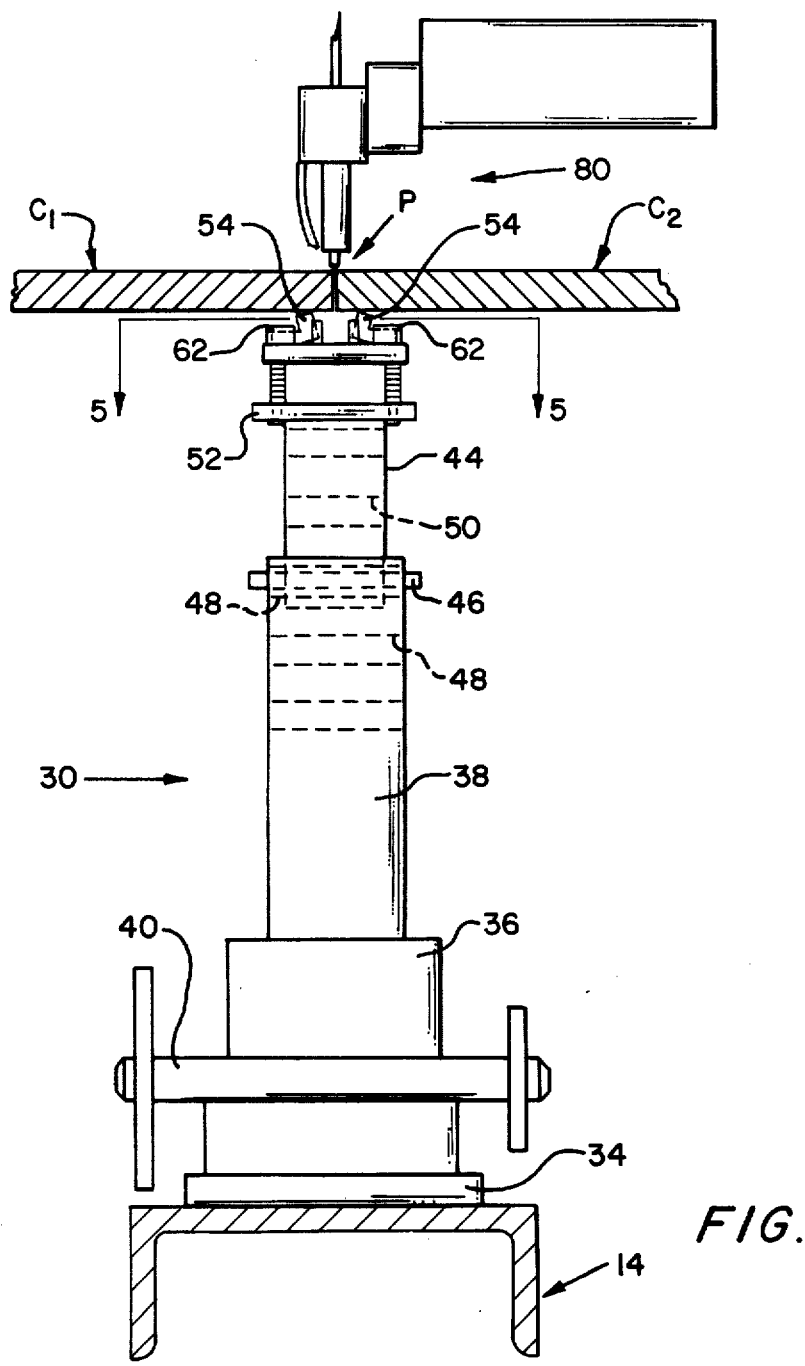
FIG. 4 is an enlarged view taken in the direction of arrows of the line 4—4 of FIG. 3 showing one of the clamping and supporting jacks incorporating gripping members or jaws in accordance with the present invention and showing the jacks before it has been fully extended to grip and support the opposed ends of a pair of tank sections.

Each of the mechanical jacks 30 of the center ring 14 is of the same construction and, as best shown in FIG. 4, includes a base 34 secured to the ring 14, a body 36 secured to the base 34, and a hollow ram 38 extending from the body 36 and adapted to be extended or retracted relative to the body 36 by suitable gearing within the body 36 upon rotation of an operating shaft 40 extending from the body 36.

As described in more detail in copending application, Ser. No. 683,662, filed May 6, 1976, each of the jacks 30 is adapted to be simultaneously actuated to extend the rams 38 thereof through a suitable chain and sprocked drive actuated by hydraulic motors 42 (FIG. 3) secured to the ring 14.

As best shown in FIG. 4, the hollow rams 38 of each of the jacks 30 has an adjustable extension 44 which extends from the outer end of the hollow ram 38 and is adapted to be secured to the ram 38 in adjusted positions by a pin 46 inserted through selective openings 48 and 50 provided respectively through the ram 38 and the extension 44.

The outer end of the extension 44 has a plate 52 of larger diameter than the extension 44 secured thereto and in accordance with the present invention, spring biased gripping members or jaws 54 are pivotally mounted on and normally extend from the outer end of the jacks 30 formed by the plates 52 on opposite sides of the center line of the jack.

Figure 7:
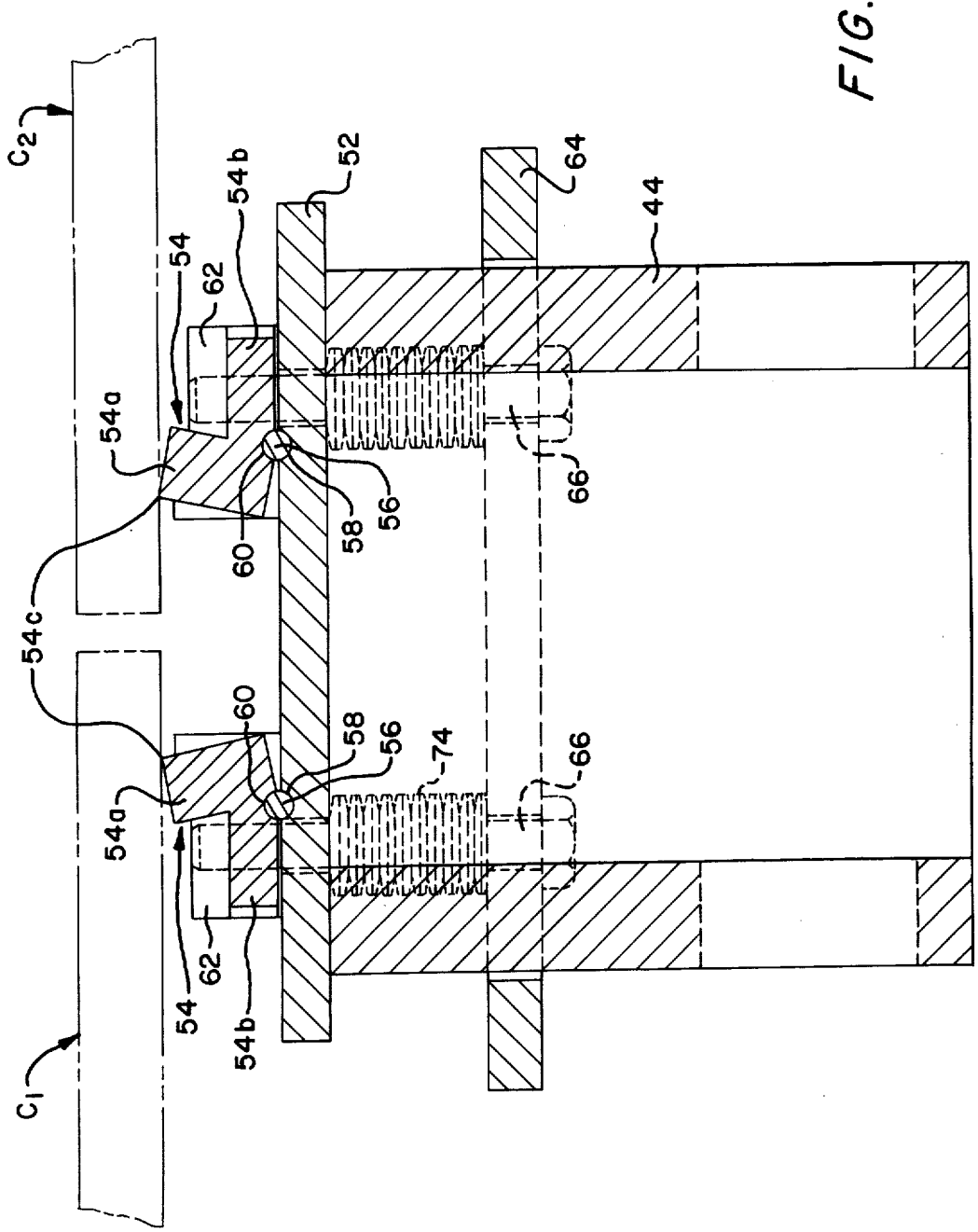
FIG. 7 is a sectional view taken in the direction of the arrows of the line 7—7 of FIG. 5

As best shown in FIG. 7 the gripping member or jaws 54 are generally L-shape in cross section and each has a leg 54a, normally extending outwardly from the plate 52 and a leg 54b extending generally parallel to the plate 52 away from the center line of the jack 30. Each gripping member or jaw 54 is pivoted on a pin 56 which extends partly in a slot 58 formed in the surface of the plate 52 and partly in slot 60 formed in the lower surface of the jaw 54. The jaws 54 may therefore rock or pivot on the pins 56. The outwardly extending leg 54a of the gripping member 54 extends at an angle of less than 90° to the leg 54b to thereby provide a tank section engaging edge 54c spaced inwardly from the pivot pin 56. The upper surface of leg 54a is inclined with respect to the horizontal. A weld point P is located between longitudinally spaced jaws 54.

Figure 5:
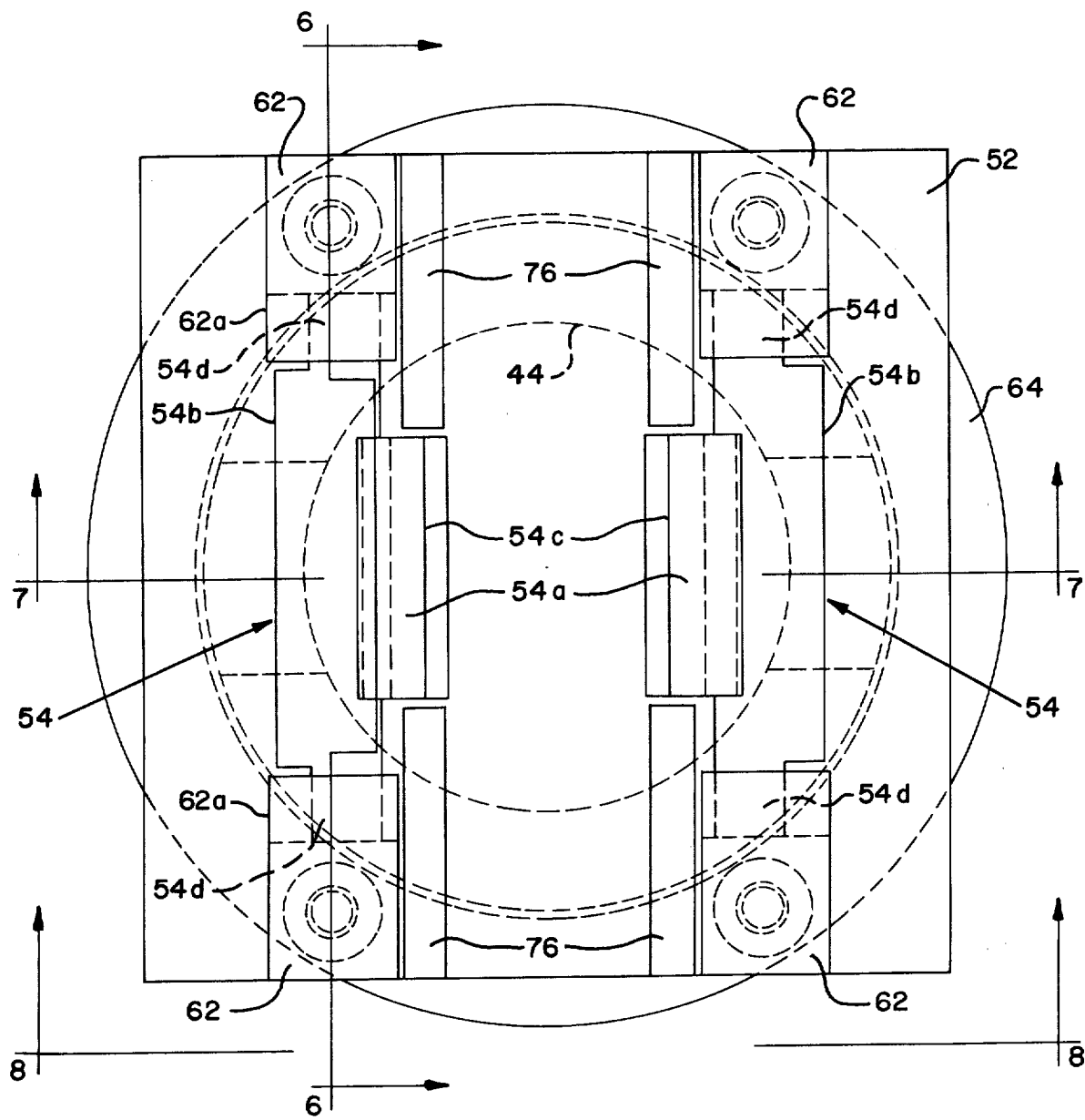
FIG. 5 is a top plan view taken in the direction of the arrows of the line 5—5 of FIG. 4.
Figure 6:
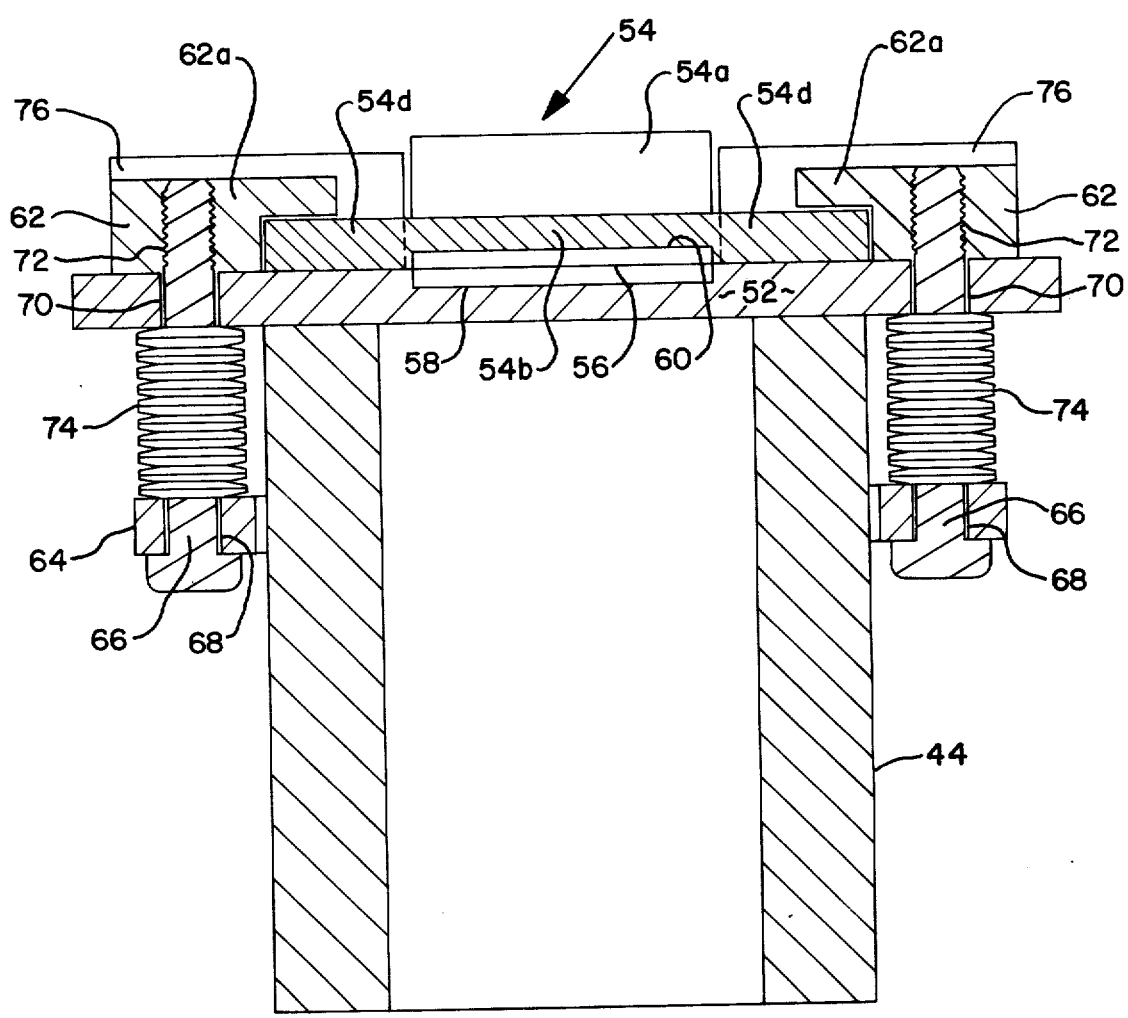
FIG. 6 is a sectional view taken in the direction of the arrows of the line 6—6 of FIG. 5.
Figure 8:
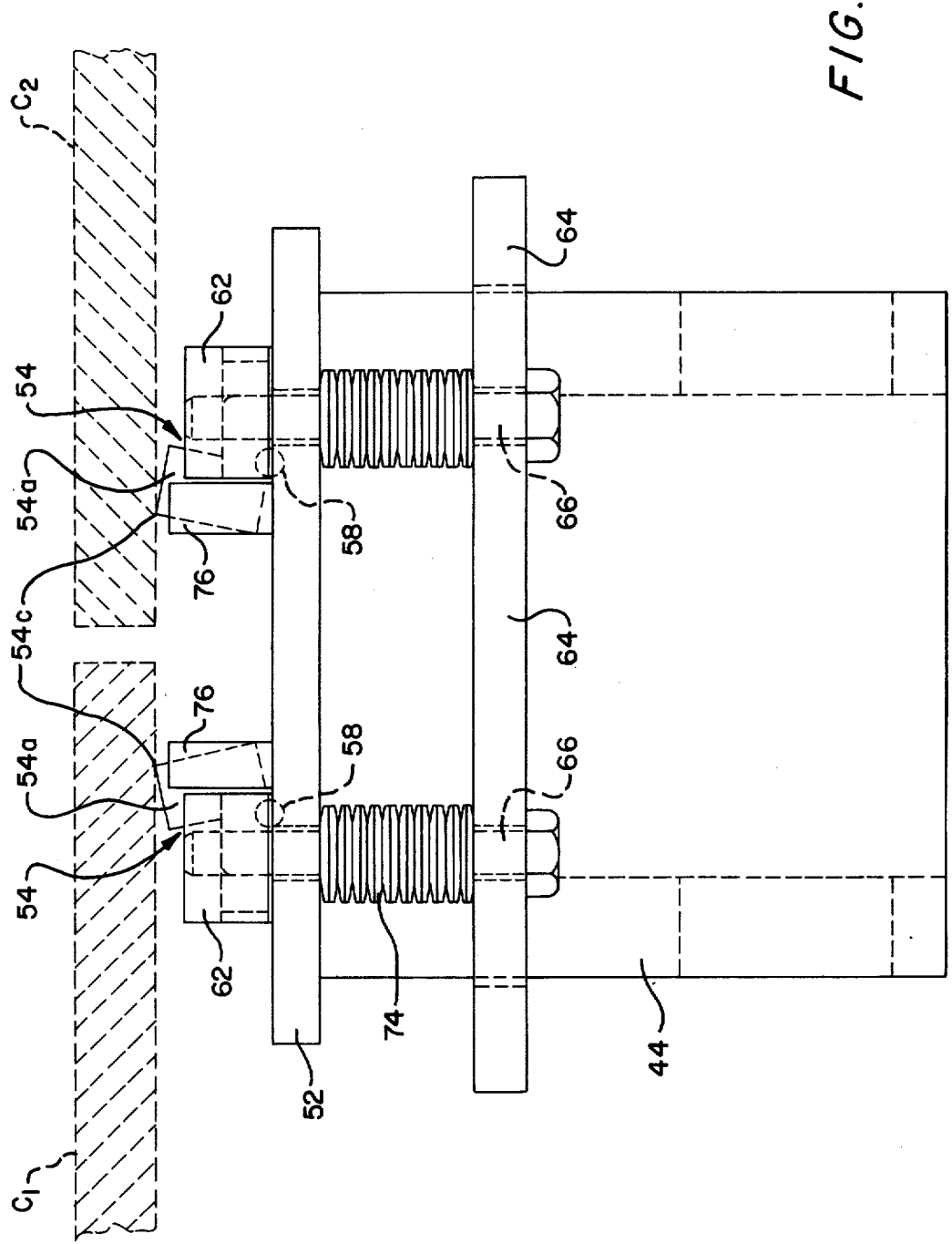
FIG. 8 is a view taken in the direction of arrows of the line 8—8 of FIG. 5.

As best shown in FIGS. 5 and 6, the legs 54b of the jaws 54 have laterally extending portions 54d which engage beneath a lip 62a of a retainer block 62 positioned on either side of the leg 54b of the gripping member or jaw 54. As shown in FIGS. 5, 6 and 8 an annular plate 64 is slidable mounted on the extension 44 of the jack 30 below the plate 52, and headed bolts 66 extend through openings 68 in the annular plate 64, slidably through openings 70 in the plate 52 and thread into threaded openings 72 in the retainer blocks 62. Compression springs 74 are mounted on and surround the bolts 66 between the upper surface of the annular plate 64 and the lower surface of the plate 52. Springs 74 serve to normally hold the retainer blocks 62 and the legs 54b of the jaws 54 against the plate 52 in the position shown in FIG. 7, while allowing the jaws 54 to pivot on the pins 56 by lifting of the retainer blocks 62 and compression of the springs 74 between the annular plate 64 and the plate 52 when the edge 54a is forced against the inner surface of the edges of the tank sections $C_1$ and $C_2$.

Supporting blocks 76 are secured to the upper surface of the plate 52 on either side of the legs 54a of the gripping members 54 and serve to provide additional support to the edge of the tank sections $C_1$ and $C_2$ after the jaws 54 have been pivoted to their full extent.

In utilizing the apparatus to weld the two tank sections $C_1$ and $C_2$ in end-to-end relationship, the tank section $C_1$ is placed on roller conveyor 28 and moved longitudinally to the left in FIG. 1 until its trailing edge is generally aligned with the center line of the center ring 14 and the mechanical jacks 30. The second section $C_2$ is then placed on the roller conveyor 28 and moved longitudinally to the left in FIG. 1 until the leading edge thereof is in opposed relation with the trailing edge of the first tank section $C_1$. The mechanical jacks 30 of the center ring 14 are then actuated to simultaneously extend the rams 38 thereof. Simultaneously, lower mechanical jacks 78 and 79, (FIG. 1) provided on the rings 12 and 16, are actuated to initially support the opposite ends of the tank sections $C_1$ and $C_2$.

As the rams 38 of the mechanical jacks 30 of the center ring 14 are extended, the edge 54c of the gripping members or jaws 54 initially frictionally engage and may actually bite into the inner surfaces of the ends of the opposed tank sections $C_1$ and $C_2$. As the rams 38 of the mechanically jacks 30 are then further extended the jaws 54 pivot on the pins 56 against the bias of the springs 74 and exert forces on the tank sections $C_1$ and $C_2$ to move the ends of the tank sections into abutting engagement and close any gaps between the sections. Thus, as viewed in FIG. 7, the jaw 54 on the left side pivots in a clockwise direction to force tank section $C_1$ transversely to the right and the jaw 54 on the left pivots in a counterclockwise direction to force tank section $C_2$ transversely to the left relatively to the direction of extension of the jack 30. After the jacks 30 have fully extended to clamp, shape and support the abutting ends of the tank sections, the hydraulic jacks 32 of the side rings 12 and 16 are then actuated to support the opposite ends of the tank sections $C_1$ and $C_2$ during rotation of the rings 12, 14 and 16 with the tank sections $C_1$ and $C_2$ supported therein in abutting end-to-end relationship.

After the tank sections $C_1$ and $C_2$ have been clamped and supported in end-to-end abutting relationship, within the rings 12, 14 and 16 as described, the rings and tank sections are then rotated as a unit and the abutting edges of the tank section are internally welded together at a suitable weld point P within the ring 14 between the longitudinally spaced jaws 54 by suitable welding equipment, generally indicated at 80 in FIG. 1. The welding equipment is mounted on a boom 82 which extends into the tank section $C_1$ and in turn is adjustably supported on a suitable support 84 positioned outside of the tank section C₁.

While a preferred embodiment of the present invention has been shown and described, it will be appreciated that changes and modifications may be made therein without departing from the spirit and scope of the invention.

Figure 9:
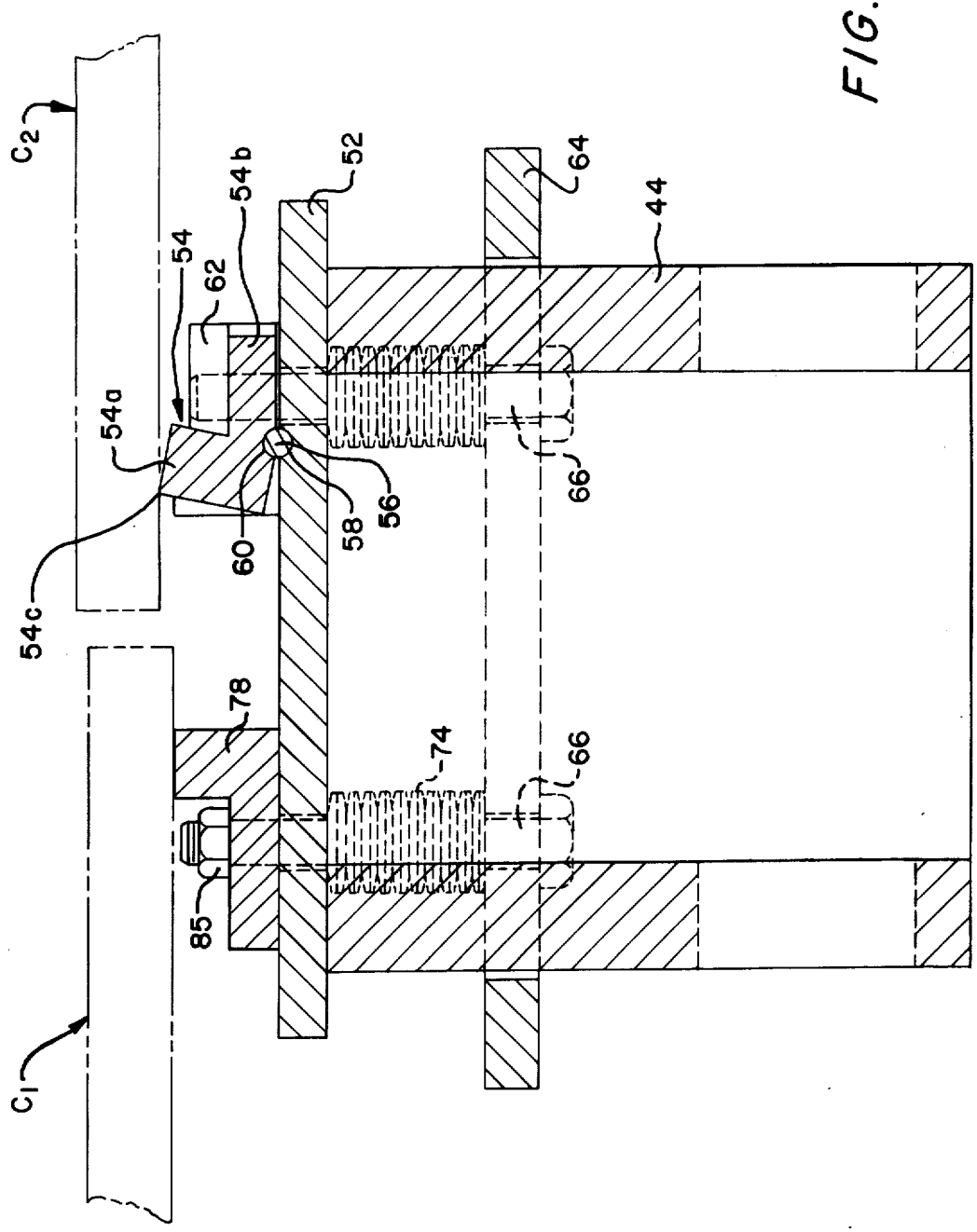
FIG. 9 is a sectional view similar to FIG. 7 illustrating an alternate embodiment of the present invention.

In one alternative, jaws 54 are mounted upon only one side of plate 52. If jaws 54 are mounted on only side of plate 52 one course, for example, C₁ is clamped against longitudinal movement by jacks 32 in ring 16. A support 78 (FIG. 9) is provided extending transversely across the remaining side of the plate 52 to support the course C₁ in the radial position that the remaining course will obtain after it moves longitudinally as jaw 54 pivots about pin 60. The jaws and the pin 56 may be eliminated from the side of the jack where supports 78 is mounted. Springs 74 are held in place by nuts 85. This embodiment is useful when a plurality of tank sections have already been assembled, and the assembled portion extends a considerable distance longitudinally of the center ring 14. The weight of such an assembled portion makes the assembled portion less adaptable to longitudinal movement toward the new course and the weld point. Thus the new section is moved longitudinally into abutting contact with the already assembled tank portion.

We claim:

1. Apparatus for clamping and supporting a pair of hollow tank sections in end-to-end abutting relationship during welding comprising, a supporting ring, a plurality of circumferentially spaced jacks mounted on said ring and extendible radially with respect to said ring to clamp and support the opposed ends of a pair of tank sections in end-to-end relationship, a gripping jaw extending from one side of the extendible end of at least one of said jacks and engagable with one of said tank sections, spring means biasing said jaw to an extended position relatively to said extendible end of said one of said jack, and means interconnecting said jaw with said extendible end of said one of said jacks whereby said jaw is moved transversely of said extendible end against the bias of said spring means to force the opposed end of said one tank section toward the opposed end of the other of said tank sections when said jaw is forced against said tank section on extension of said jacks.

2. Apparatus as defined in claim 1 including a second gripping jaw extending from the opposite side of said extendible end of said one jack for engagement with the other of said tank sections, spring means biasing said second jaw to an extended position relatively to said extendible end of said one of said jacks, and means interconnecting said second jaw with said extendible end of said one of said jacks whereby said second jaw is moved transversely of said extendible end to force said other of said tank sections toward said one tank sections when said second jaw is forced against said other of said tank sections on extension of said jacks.

3. Apparatus as defined in claim 1 wherein said interconnecting means included a pivot connection between said jaw and said extendible end of said one of said jacks, whereby said jaw moves transversely of said extendible end by pivoting of the jaw toward the opposite side of said extendible end when said jaw is forced against said one tank section of said pair of tank sections.

4. Apparatus for obtaining longitudinal alignment and abutting contact of hollow tank courses to be welded together comprising:
a welding ring having a plurality of clamping jacks mounted about the internal periphery of said ring; said jacks extending radially inwardly within the ring; a weld point located at about the longitudinal mid point of said ring;
means for supporting courses to be welded together adjacent one another, end-to-end in said ring; a plurality of pivoted jaws mounted upon at least some of said jacks longitudinally spaced on at least one side of said weld point; resilient means biasing said pivoted jaws in a direction away from said weld point, whereby application of clamping power to said jacks will cause said jaws to contact at least one of said courses and overcome the bias of said spring and move said contacted course longitudinally toward said weld point and into abutting contact with the adjacent course.

5. Apparatus according to claim 4 wherein said pivoted jaws are provided longitudinally spaced from each side of said weld point.

6. Apparatus according to claim 4 wherein said pivoted jaws are provided longitudinally spaced from one side only of said weld point.

7. Apparatus according to claim 6 wherein a transverse support is provided longitudinally spaced on the outer side of the weld point to support said adjacent course.

8. Apparatus according to claim 4 wherein said jaws are pivotally mounted about a pin extending transversely in said ring.

9. Apparatus according to claim 8 wherein said pin is mounted in a slot in an external surface of said jack.

10. Apparatus according to claim 8 wherein a retainer is provided which engages at least one end of said jaws and prevents the jaw from pivoting about said pin until the bias of said resilient means is overcome.

11. Apparatus according to claim 10 wherein a retainer engages each end of said jaw.

12. Apparatus according to claim 11 wherein said jaw includes a tank contacting portion which is inclined with respect to the horizontal to facilitate engagement with a tank course and longitudinal movement of the tank course toward said weld point.

13. Apparatus according to claim 12 in which a pair of transversely extending fixed course supports are provided on each side of said tank contacting portion.

14. Apparatus for obtaining longitudinal alignment and abutting contact of hollow tank courses to be welded together comprising:
a welding ring having a plurality of clamping jacks mounted about the internal periphery of said ring, said jacks extending radially inwardly within the ring; a weld point located at about the longitudinal mid point of said ring;
means for supporting courses to be welded together adjacent one another, end-to-end in said ring; a plurality of pivoted jaws mounted upon at least some of said jacks longitudinally spaced on each side of said weld point; each of said jaws being pivotally mounted about a transversely extending pin; a retainer engaging opposite ends of said pivoted jaws; at least one spring engaging said retainers and biasing said jaws in a direction away from said weld point, whereby application of clamping power to said jacks will cause said jaws to contact said courses and overcome the bias of said spring and move said courses longtudinally toward each other and into abutting contact for welding.

15. Apparatus according to claim 14 wherein each jaw includes a tank contacting portion having an upper surface which is inclined with respect to the horizontal to facilitate engagement with a tank course and longitudinal movement of the tank course toward said weld point.

16. Apparatus according to claim 15 in which a pair of transversely extending fixed course supports are provided on each side of said tank contacting portion.

* * * * *